Patented Feb. 14, 1939

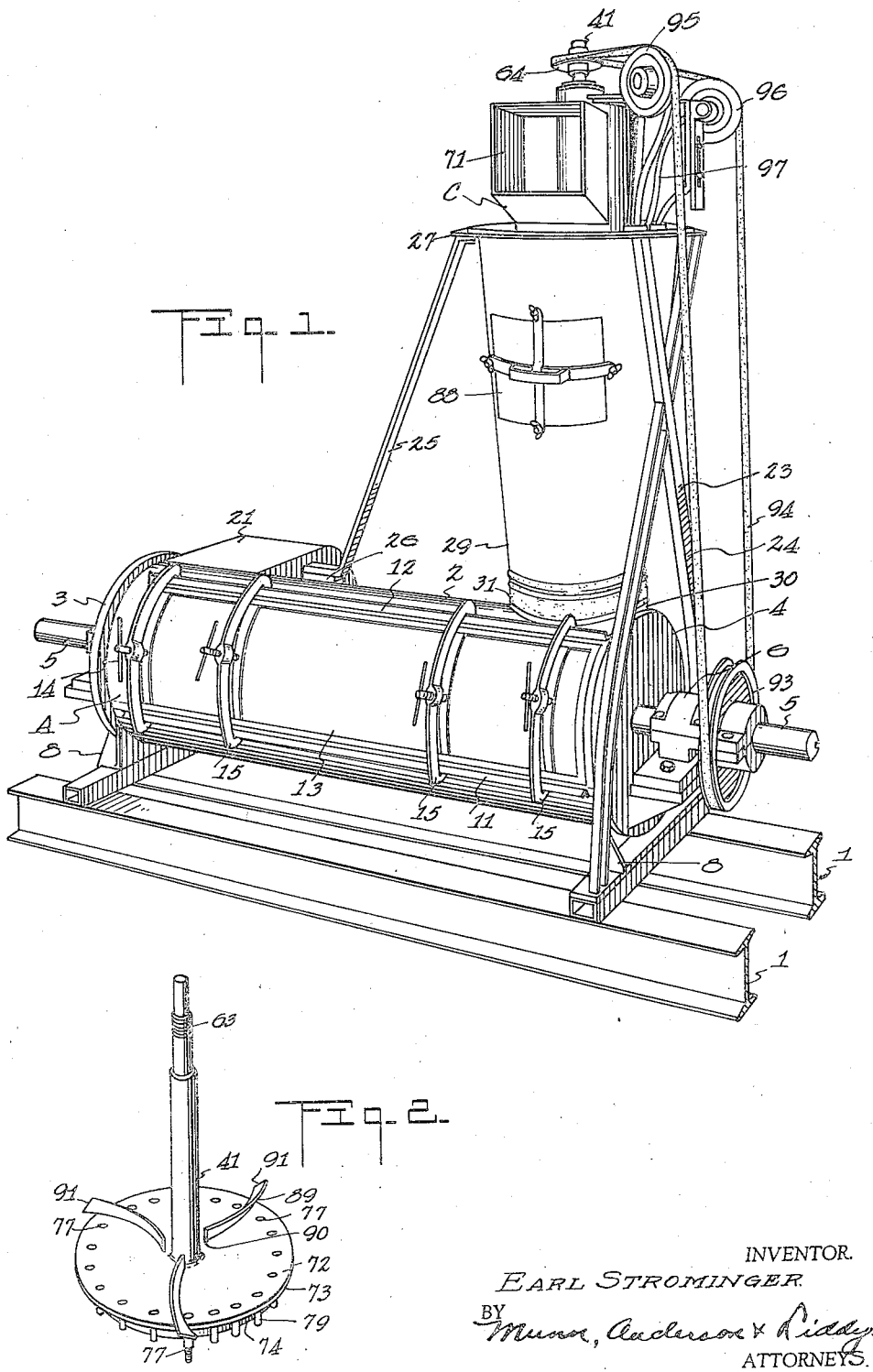

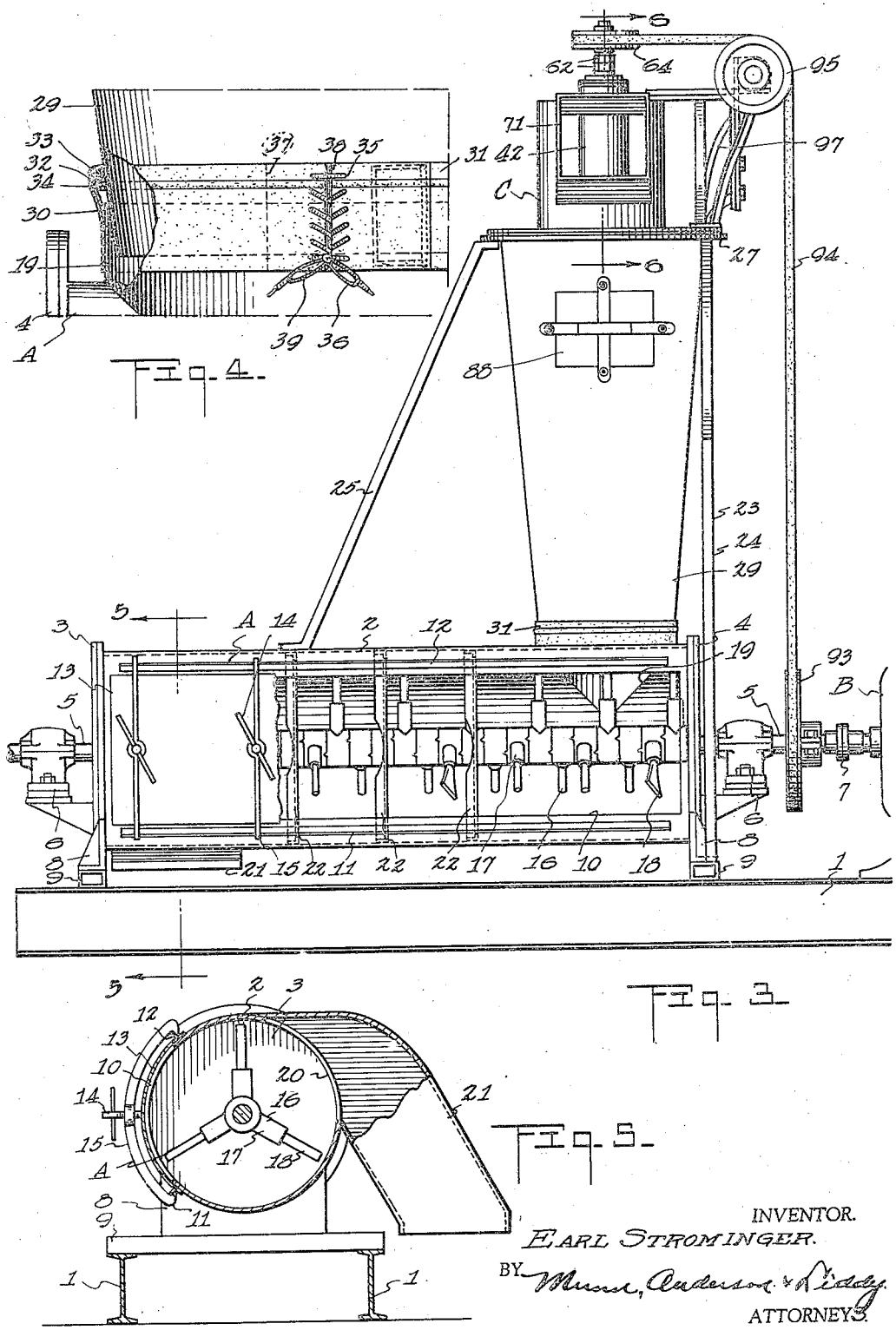

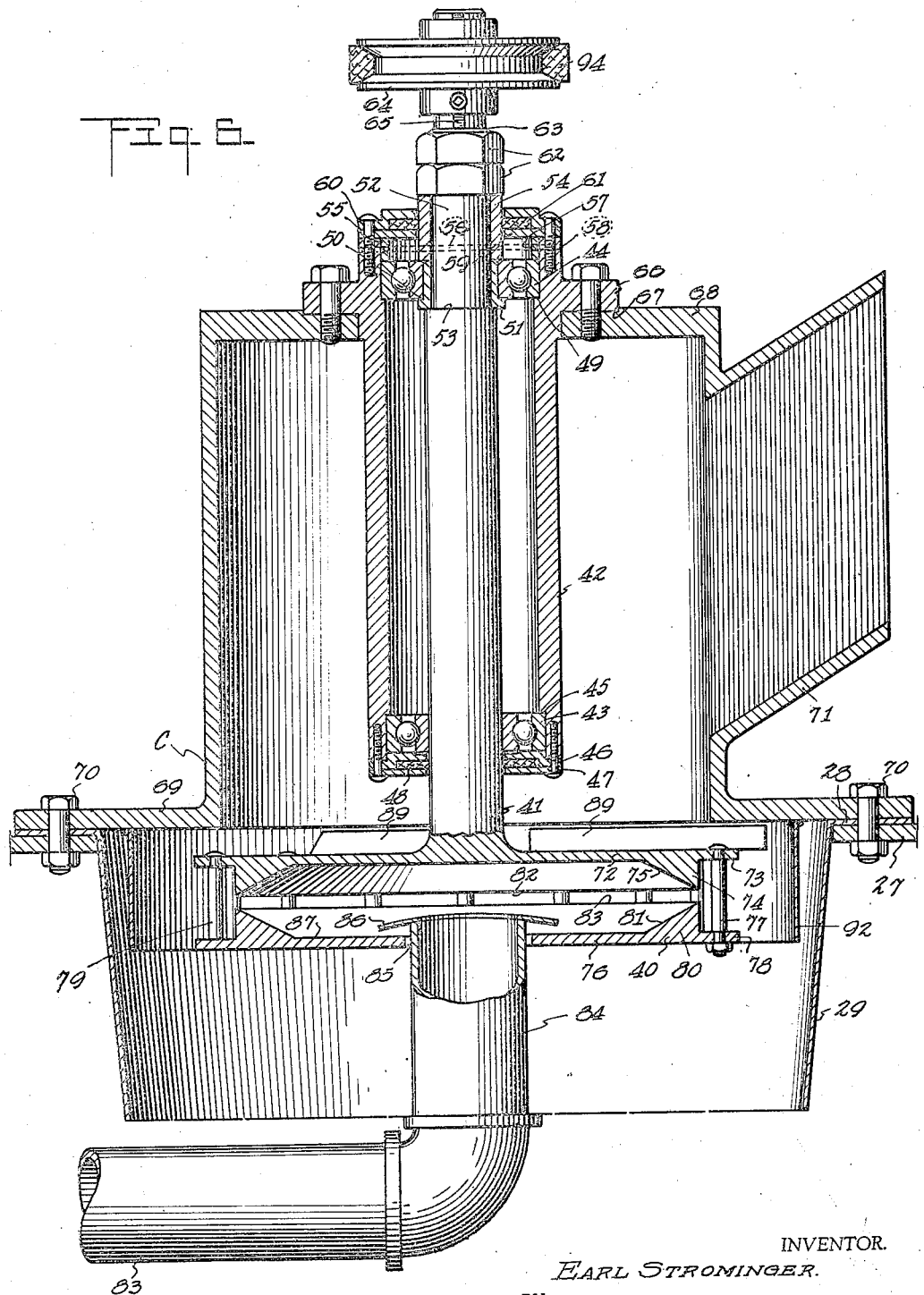

2,146,776

UNITED STATES PATENT OFFICE 2,146,776

FEED MIXER

Earl Strominger, Livermore, Calif.

Application January 21, 1936, Serial No. 60,072

10 Claims. (Cl. 259—23)

My invention relates to improvements in feed mixers, and it consists of the combinations, constructions and arrangements hereinafter described and claimed, and in the steps hereinafter set forth.

An object of my invention is to provide a feed mixer which is continuous in operation, and which will properly mix molasses with feed so that the mixture will be uniform throughout. In the standard machines the feed is mixed with the molasses in batches. This causes wet soggy lumps or pellets to form in the feed, and also some of the feed is not properly mixed with molasses and remains dusty and dry. The lumpy feed, when fed to cattle, will cause an acid stomach, while the feeding of dry, dusty feed will cause nose sniffles and other infections.

I employ centrifugal means for separating the feed as it enters the device and for causing this feed to fall in a curtain-like form. The same centrifugal means also ejects the molasses in a spray, this molasses being thrown off by the centrifugal means and intimately mixing with the feed so that a uniform mixture of feed and molasses is provided in a continuous process. The mixture then is fed into a beater drum and finally is delivered to an outlet conduit where the feed may be sacked, if desired.

The device is simple in construction, and is durable and efficient for the purpose intended. It requires no heat to properly mix the molasses with the feed, and two operators can handle the entire milling and mixing of the feed in a plant. A saving of approximately twenty-five per cent of molasses results from using the device, and the machine disclosed in the drawings can handle about two tons of feed per hour.

The steps in carrying out the method are: 1, the spreading of the feed into a thin layer and the continuous moving of this feed through a mixing zone; 2, the breaking up of the molasses into an apron-like spray and the projecting of this spray against the moving layer of feed in the mixing zone; and 3, the beating of the feed after being mixed with molasses so that a uniform mixture will result.

Other objects and advantages will appear in the following specification, and the novel features of the device will be particularly pointed out in the appended claims.

My invention is illustrated in the accompanying drawings forming a part of this application, in which Figure 1 is a perspective view of the invention with the driving motor removed;

Figure 2 is a perspective view of a part of the rotating member;

Figure 3 is a front elevation of the device showing a portion of the beater cover removed;

Figure 4 is an enlarged detail from the opposite side of Figure 3, a portion being shown in section;

Figure 5 is a section along the line 5—5 of Figure 3; and

Figure 6 is a section along the line 6—6 of Figure 3.

In carrying out my invention I make use of two I-beams 1, for supporting a beater indicated generally at A, and a motor indicated generally at B. The beater in turn has a mixer indicated generally at C associated therewith. I will first describe the beater A, and then the mixer C.

In Figures 1, 3 and 5 I show the beater A as comprising a cylinder 2 closed at its ends as at 3 and 4. A beater shaft 5 is rotatably mounted in the cylindrical casing 2, and this shaft is supported by bearings 6 and is operatively connected to the motor B by a flexible coupling 7 or other suitable means. The motor is designed to rotate the shaft at a speed of approximately 1200 R. P. M.

The ends 3 and 4 of the beater are supported by legs 8, and these in turn are mounted on a frame 9 which rests upon the I-beams 1. The casing 2 is provided with an opening 10 that extends substantially throughout the entire length of the casing and angle irons 11 and 12 extend along the longitudinal sides of the opening. In Figure 1 I show a cover 13 fitting over the opening 10, and this cover is clamped into place by hand screws 14, which in turn are mounted in the clamps 15, the ends of the clamps engaging with the angle irons 11 and 12. The hand screws 14 and clamps 15 are used for securing the cover 13 in place.

A plurality of beaters 16 are mounted on the beater shaft 5, and Figure 5 shows the beaters 16 as carrying sockets 17 that extend radially from the shaft in three directions. Beater elements 18 are removably disposed in the sockets and may be of different shapes. For example, in Figure 3 I show certain of the beater elements 18 as having flat inclined blade-like portions, while other elements are in the form of rods. These elements are rapidly revolved in the beater A by the shaft 5, which in turn is rotated by the motor B. The result is that the mixture of feed and molasses delivered to the beater through the inlet opening 19, shown in Figure 4, is thoroughly agitated as it moves from the right-hand end of the cylinder in Figure 3 to the left-hand end. Figure 5 shows the left-hand end of the cylinder 2 provided with an outlet opening 20 that communicates with an outlet pipe or conduit 21. This conduit may lead to any sacking device, none being shown. It also will be noted from Figure 3 that circular angle irons 22 are mounted in the casing 2, and these angle irons prevent the too rapid flow of feed from the inlet end to the outlet end of the beater A.

The mixer is shown in Figures 1, 3 and 6 and is mounted on a super-structure 23, which in turn is supported by the frame 9. This super-structure consists of channel irons 24 formed into an X, see the right-hand end of Figure 1, and a supporting member 25 that extends from a projection 26 on the cylinder 2. The members 24 and 25 support a ring 27, and this ring in turn carries a flanged upper end 28 of a conical housing 29 forming a part of the mixer C. The housing 29 therefore is supported by the ring 27 and by the super-structure 23. Figure 4 shows the bottom of the housing 29 as extending into the inlet end 30 of the beater A. The inlet end 30 in turn constitutes a rim around the inlet opening 19 in the beater.

I provide novel means for preventing dust from escaping between the housing 29 and the rim 30. This device consists of a leather collar 31 encircling the lower end of the housing 29. The collar has a guideway 32 formed in its top through which a lacing string 33 is passed. A ring 34 is secured to the housing 29 and the string 33 is used for tightening the top of the collar at a position above the ring. The ends of the lacing 33 are then passed through eyelets 35 in the ends of the collar, and are tied as indicated at 36. In this way the collar is securely fastened to the housing 29 and extends over the rim 30. It will be noted from Figure 4 that the collar has an under portion 37 that extends beyond the end 38 of the collar so as to underlie a portion of the collar end 39.

In the mixer C I mount a rotating member 40, see Figure 6. The member 40 is disposed near the top of the housing 29 and is carried by a shaft 41. The shaft, in turn, is journaled in a sleeve 42 and is spaced from the sleeve by ball bearing races 43 and 44. The ball race 43 is slipped over the shaft 41 and is held in a seat 45 in the sleeve 42 by a retaining ring 46. A second retaining ring 47 cooperates with the ring 46 to hold a felt washer 48 in place.

The ball race 44 is mounted in a seat 49 in the sleeve 42 and the inner member of the race is mounted in a seat 50 in a sleeve 51. The sleeve is disposed on a reduced portion 52 of the shaft 41 and bears against a shoulder 53 on the shaft. A spacing sleeve 54 bears against the sleeve 51 and holds the inner member of the ball race 44 in position. An oil ring 55 is disposed in the sleeve 42 and bears against the outer member of the race 44. This ring 55 has an annular groove 56 in its outer periphery and radially extending openings 57 extend from the groove 56 to the inner surface of the ring. The sleeve 42 has openings 58 therein through which oil may be forced for feeding the oil into the annular groove 56 and the openings 57. This oil will flow down upon the ball races 44 and 43 and will lubricate them.

The oil ring 55 is held in place by a retaining ring 59 and a second ring 60 cooperates with the ring 59 for holding a felt washer 61 in place. Lock nuts 62 are screwed upon a threaded portion 63 of the shaft 41 and lock the assembly together. The top of the shaft 41 carries a pulley 64 that is keyed to the shaft at 65.

The sleeve 42 has an annular flange 66 that is mounted in a recessed portion 67 in a casting 68. The casting 68 in turn has a flanged bottom 69 which is secured to the supporting ring 27 by bolts 70 or other suitable fastening means. The casting 68 has a feed inlet chute 71 extending from one side thereof.

In Figures 2 and 6 I show the construction of the rotating member 40. This member has an upper disc 72 that is integral with the shaft 41. This disc has an annular flange 73 and an annular rib 74 that is provided with an inclined inner surface 75. A second disc 76 is secured to the disc 72 by bolts 77. The bolts 77 are passed through openings in a flange 78 corresponding to the flange 73. In the drawings I have shown three bolts 77 for securing the disc 76 to the disc 72. In addition I show a number of spacing pins 79 carried by the flange 73. The lower ends of these pins bear against the flange 78 and limit the movement of the disc 76 toward the disc 72. The disc 76 is also provided with an annular rib 80 with an inclined inner surface 81. The length of the pins 79 is such that the edges 82 and 83 on the discs 72 and 76 respectively are spaced from each other a slight distance so that an annular opening is provided between the discs. Figure 2 shows a perspective view of the shaft 41, the discs 72, the spacing pins 79 and the bolts 77.

An inlet pipe 83 for conveying molasses extends through the housing 29 and has a portion 84 bent upwardly at right angles. This portion enters through an opening 85 in the lower disc 76. A rim 86 is provided at the end of the pipe portion 84 and this rim delivers the molasses onto the upper surface 87 of the disc 76. A door 88, see Figures 1 and 3, is provided on the side of the housing 29 in order to gain access to the pipe 83.

The member 40 also carries vanes 89, see Figures 2 and 6. I show three vanes disposed on top of the disc 72 and the inner ends 90 of these vanes extend upwardly and are parallel with the axis of the shaft 41. The vanes are substantially arcuate in shape and also are inclined or twisted so that the outer ends 91 will extend substantially at an angle of thirty degrees to the plane of the disc 72. The shape of the blades is such as to receive the feed from the inlet 71, and to throw this feed radially against an apron 92 carried by the flange 69, see Figure 6. The feed on striking this apron is caused to move downwardly and as the feed passes the annular opening provided by the edges 82 and 83 of the member 40, the molasses will be sprayed upon the feed so that a uniform mixing of molasses with the feed will result.

From the foregoing description of the various parts of the device, the operation thereof may be readily understood.

In Figure 3 I have shown the motor B directly connected to the beater shaft 5. In Figure 1 I show the shaft 5 operatively connected to the shaft 41 by a drive pulley 93 mounted on the shaft 55 and connected to the pulley 64 on the shaft 41 by a belt 94. The belt 94 is passed over idler pulleys 95 and 96, and these pulleys are adjustably secured to brackets 97 so that any slack in the belt may be taken up. The ratio between the pulleys 93 and 64 is such as to cause the vertical shaft 41 to rotate at 3000 R. P. M., while the horizontal shaft 5 is rotating at 1200

R. P. M. The feed is continuously moved onto the member 40 through the chute 71 and the vanes 89 throw this feed radially against the apron 92. The feed therefore is formed into a thin layer which is continuously moving. The vanes 89 also act as fan blades and create a draft which will convey the feed downwardly into the housing 29 after the feed strikes the apron 92 and is changed in its course. The rotating member 40 also causes the molasses entering the member from the pipe section 84 to flow toward the annular slot formed between the edges 82 and 83. The centrifugal force is such as to cause the molasses to be ejected in a spray-like form from the slot. The pins 79 help to break the spray-like form of molasses into finer particles for aiding in a more intimate and smoother mixing of these particles with the feed. This molasses strikes the feed at right angles and there is an intimate combining of the molasses with the feed. A uniform mixture of the two will result. The mixture of feed and molasses will then be whirled downwardly through the housing 29 and will enter the beater A. The downward draft through the housing 29 caused by the vanes 89 is sufficient to carry the mixture of feed and molasses through the beater A from the inlet to the outlet end. During the movement of the feed and molasses through the beater, the beating members 18 will thoroughly agitate and beat the mixture until a perfect blending results. In order to slow up the flow of the mixture through the beater I provide the flanged rings 22. The flanged rings 22 cooperate with the beating members 18 to break up the pellets and the lumps and thoroughly impregnate the solid feeds with the liquid molasses. The mixture finally reaches the outlet opening 20 in the beater and then passes through the outlet chute 21 and may be sacked or stored in any other convenient manner.

It will be seen from this that the device mixes molasses and dry feed thoroughly. As already stated, due to the uniform mixing, no wet soggy lumps or pellets are formed and no dry dusty feed will result. The device works without heat and this obviates the disadvantage of the possibility of souring the feed, or caramelizing the feed, which might result from the use of too much heat. Means for pumping in the molasses through the tube 83 as required may be provided, none being shown. The process is continuous in operation, and therefore eliminates the mixing by batches which is now the customary method. A saving of 25% of the molasses results with this device, and cattle will be more likely to eat the mixture due to the uniform mixing of molasses with the feed.

While I have shown only the preferred form of my invention, it should be understood that various changes or modifications may be made within the scope of the appended claims without departing from the spirit of the invention.

I claim:

1. In combination, a housing, a rotating member mounted therein, means for delivering feed to said member, vanes carried by the member for throwing the feed radially therefrom, means for changing the flow of feed to one parallel with the axis of the member, means for delivering a fluid to the member, and means carried by the member for spraying the fluid onto the feed.

2. In combination, a housing, a rotating member mounted therein, means for continuously delivering material to the member, an apron encircling the member, vanes carried by the member for throwing the material in a radial direction therefrom and against the apron, the movement of the material when striking the apron being changed to a downward direction, said member being hollow and provided with an annular outlet opening, and means for delivering a fluid to the interior of the member, the fluid being ejected through the outlet in a spray by the rotating member, this spray striking the material and intimately mixing therewith.

3. In combination, a housing, a rotating member mounted therein, means for continuously delivering material to the member, vanes carried by the member for throwing the material in a radial direction therefrom and against the housing wall, the movement of the material when striking the wall being changed to a downward direction, said member being hollow and provided with an annular outlet opening, and means for delivering a fluid to the interior of the member, the fluid being ejected through the outlet in a spray by the rotating member, this spray striking the material and intimately mixing therewith, and a beater for receiving the mixture of material and fluid and beating the mixture continuously.

4. In combination, a housing, a rotating hollow member mounted therein and provided with an annular outlet, means for continuously feeding material to the member, vanes carried by the member for throwing the material radially therefrom, means for feeding a fluid to the interior of the member, said member spraying the fluid from the annular outlet against the material for intimately mixing the two together, a casing for receiving the material mixed with fluid from the housing, the draft from the vanes causing the material to pass through the housing and casing, and material beating means mounted in the casing.

5. In combination, an inlet for feed, an inlet for molasses, a single rotatable member for forming the feed into a thin curtain-like layer and for breaking the molasses up into an apron-like spray, and means for suddenly altering the flow of feed for breaking it up into its particles and for directing the curtain-like layer of feed past the apron-like spray of molasses for causing a uniform and initmate mixing of the feed and molasses.

6. In combination, a housing having an inlet for feed, a rotatable member having means on its outer surface for throwing the feed in a radial direction when the member is rotated, means for changing the direction of the moving feed into one substantially parallel with the axis of the member, means for delivering molasses to the interior of the member, said member having a circumferential outlet for the molasses that will cause the molasses to be projected radially against the feed in an apron-like spray when the member is rotated, whereby a continuous, uniform and intimate mixing of the molasses with the feed is effected.

7. In combination, a rotatable member provided with vanes on its upper surface, means for feeding material to the vanes, means for rotating the member for throwing the material in a radial direction, means for altering the course of the material from one in a radial direction to one parallel with the axis of the member, said member being hollow and provided with a circumferential slot, the bottom of the member having a central opening therein, a fluid conveying pipe extending up through the opening, whereby fluid entering the interior of the member from the pipe will be ejected by centrifugal force through the slot by the rotating member and will intimately mix with the curtain-like layer of material.

8. In a feed mixer, a rotating member formed from two discs, means securing the discs together so that an annular outlet opening is provided for the member, the lower disc having a central opening, and a fluid inlet pipe extending through the central opening for delivering a fluid to the interior between the two discs, and means for rotating the member for driving the fluid through the annular outlet by centrifugal force, and a rim disposed at the end of the pipe for conveying the fluid beyond the rim of the central opening and depositing it on the upper surface of the lower disc.

9. In a feed mixer, a housing having an open lower end, a casing having a rimmed opening for receiving the lower end of the housing, and a flexible shield secured to the encircled housing just above the rimmed opening, the lower end of the shield extending over the rim of the casing opening for sealing the connection between the housing and the casing.

10. The herein described method of intimately and uniformly mixing molasses with feed which consists in rapidly moving the feed in a flat plane and then abruptly changing the direction of movement of the feed for separating all of the particles from each other, and in breaking up molasses into a spray and discharging the spray against the separated particles of feed after the feed has been changed in its course, whereby a continuous uniform and intimate mixing of the molasses with the feed is effected.

EARL STROMINGER.